Jan. 6, 1942.  C. E. KERR  2,268,753
JUICE EXTRACTOR
Filed Aug. 9, 1938  2 Sheets-Sheet 1
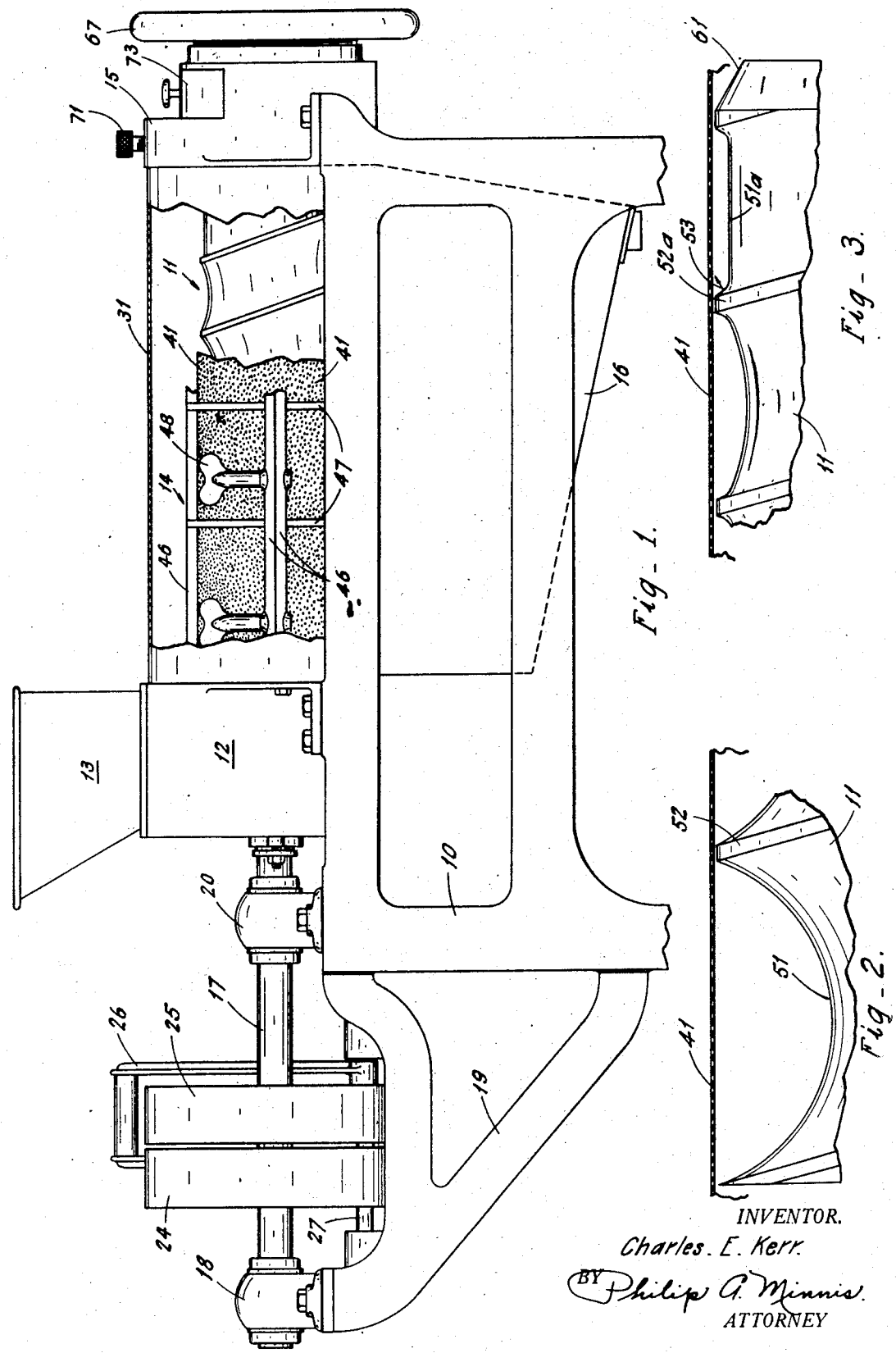
INVENTOR.
Charles. E. Kerr.
BY Philip G. Minnis.
ATTORNEY Jan. 6, 1942.     C. E. KERR     2,268,753
JUICE EXTRACTOR
Filed Aug. 9, 1938     2 Sheets-Sheet 2

INVENTOR.
Charles. E. Kerr.
BY Philip A. Minnis
ATTORNEY.

Patented Jan. 6, 1942

2,268,753

UNITED STATES PATENT OFFICE 2,268,753

JUICE EXTRACTOR

Charles E. Kerr, Hoopeston, Ill., assignor to Food Machinery Corporation, San Jose, Calif., a corporation of Delaware Application August 9, 1938, Serial No. 223,867

18 Claims. (Cl. 100—48)

This invention relates to juice extracting means of the screw expressing type employed with tomatoes, grapefruit and the like products, and is concerned more particularly with an improved machine of this character having a long and efficient operating life.

It is a general object of the invention to provide an improved screw expressing juice extractor.

Another object of the invention is to provide a juice extractor of the character noted, in which the entire length of the screen surrounding the expressing screw is utilized for the juice expressing operation.

Another object of the invention is to provide a juice extracting machine of the character referred to in which the expressing operation is controlled in accordance with the position of the product being progressed through the machine.

Other objects of the invention will appear from the following description of a preferred embodiment of the invention as illustrated in the accompanying drawings, in which:

Fig. 1 is a side elevational view, partially broken away, of a juice extracting machine embodying my invention.

Fig. 2 is an enlarged view, partially in section, illustrating the relation of a part of the juice expressing screw to the screen.

Fig. 3 is a view similar to Fig. 2, but illustrating a different part of the screw adjacent the discharge end of the machine.

Generally, the juice extracting machine of my invention disclosed herein, is adapted for use in juicing tomatoes, grapefruit, and other similar products, and is concerned primarily with the provision of means for obtaining the desired character of juice expressing action on the product during its travel through the machine between the screw and the screen.

Figure 4:
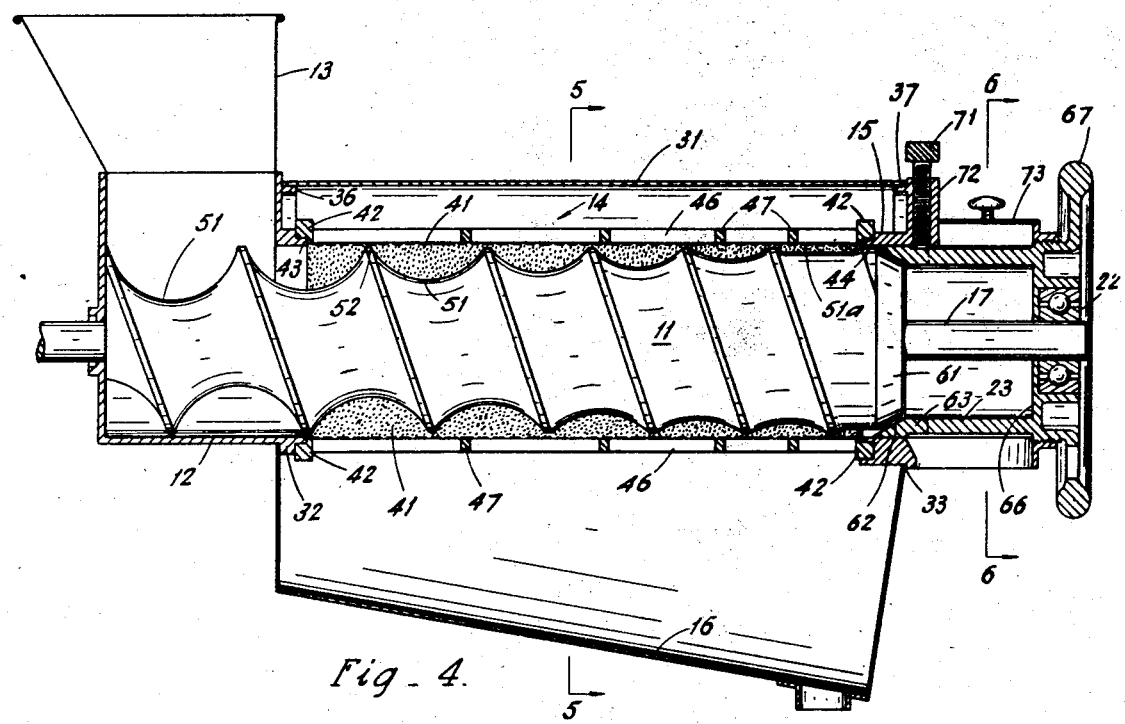
Fig. 4 is a longitudinal vertical section of the machine, taken through the axis of the juice expressing screw, with the screw shown in elevation.

Referring to Figs. 1 and 4, the machine includes a frame 10 which supports various operative parts of the machine including a screw 11 having its feed end disposed within a feed chamber housing 12 carrying a feed hopper 13 and extending through a cylindrical screen assembly 14 secured between the feed housing 12 and a pomace discharge housing 15, and above a juice discharge sump 16. The screw 11 is secured on a longitudinal drive shaft 17 journalled by a bearing 18 on a frame bracket 19, a bearing 20 on the frame 10 and a bearing 22 supported in the discharge housing 15 by an adjustable discharge throat member 23 referred to hereinafter.

The controllable drive means for screw 11 may include respective idler and driven pulleys 24 and 25 (Fig. 1) which are journalled and fixed respectively on the drive shaft between the bearings 18 and 20 for cooperation with suitable belt drive means. Associated with the pulleys 24 and 25 is a belt shifter 26 slidably mounted at its lower end on a rod 27 secured on the frame bracket 19.

Figures 5, 6:
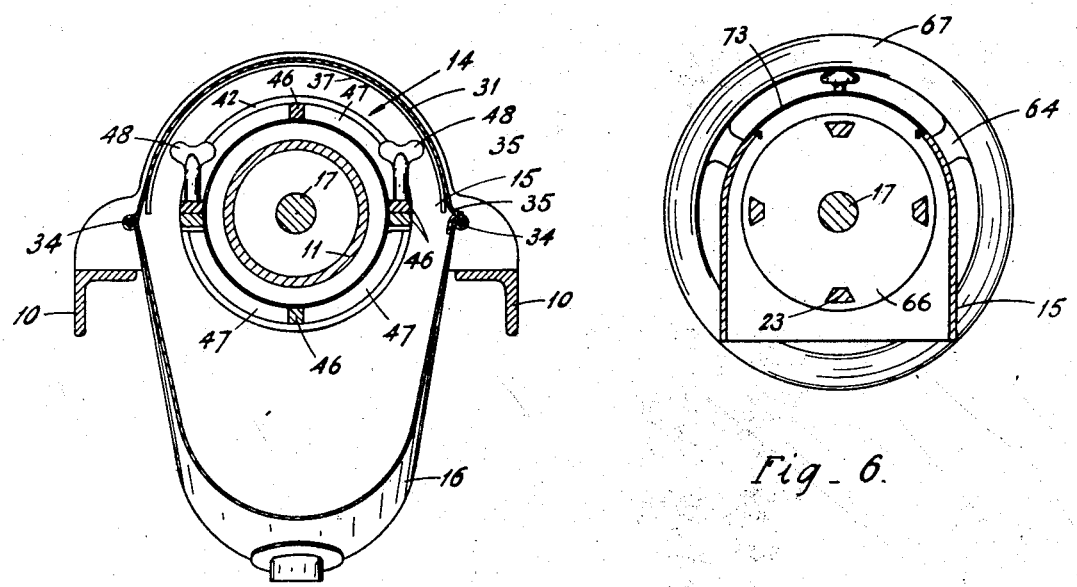
Fig. 5 is a vertical transverse section through the machine, taken in the plane of the line 5—5 in Fig. 4.
Fig. 6 is a vertical transverse section at the discharge end of the machine, the view being taken in the plane of the line 6—6 in Fig. 4.

Preferably, the juice extracting operation is effected within an enclosed juicing chamber formed by the sump 16 and a removable cover 31, both of which are preferably formed of acid resistant material. Referring to Figs. 4 and 5, the end walls of the sump 16 are suitably secured to respective annular flanges 32 and 33 of the feed housing 12 and the discharge housing 15, and the side walls of the sump are formed in tubular fashion at 34 to support ribbed lower side edges 35 of the cover 31. The ends of the cover 31 are supported by respective annular ribs 36 and 37 of the housings 12 and 15.

The cylindrical screen assembly 14 (Figs. 1, 4 and 5) is made with respective upper and lower screen halves 41 of suitable perforated metal sheets which have their ends suitably secured to respective semi-circular end frames 42 which engage similar annular seats 43 and 44 provided at the facing ends of the housings 12 and 15. The semi-circular end frames 42 of each screen half are connected by a plurality of longitudinal bars 46 which are braced by a plurality of annular ribs 47 secured therebetween. As seen in Figs. 1 and 5, the bars 46 at the meeting edges of the screen halves may be detachably secured together by suitable bolt and wing nut means 48.

The screw 11 is formed with a root which gradually increases in diameter from the feed end to the discharge end of the screw, while the lead of the screw decreases so that the screw gradually closes in on the product operated upon and forces the liquid parts thereof through the screen. Preferably, the thread of the screw is made more prominent at the discharge end, becoming substantially flat to direct the pressure exerted thereby in a desirable direction in controlling the flow of the product along the screw, as well as the direction of the expressing force exerted thereby relative to the screen.

In accordance with my invention, as illustrated, for example, in Figs. 2 and 4, the root or groove of the worm at the feed end, as at 51, is arcuate and merges into the thread 52, so that as the screw turns it has a pinching or squeezing effect tending to force the product radially outward of the screw against the screen. Referring to Figs. 3 and 4, it will be noted that at the discharge end the root of the screw is substantially flat as at 51a, while the thread at 52a is relatively prominent so that the pressure exerted normally of its leading face is almost parallel to the axis of the screw. The arrow 53 in Fig. 3 indicates a desirable direction of pressure resulting from a pressure angle, i. e., between the thread surface at the base of the arrow and a plane perpendicular to the axis of the screw, which should not be more than substantially 30 degrees. In other words, the face of the thread surface adjacent the rim of the thread should be not less than about 60 degrees from the screw axis. Thus the propelling force exerted by the thread face on the material passing through this portion of the groove of the screw is predominantly endwise.

It will be seen that the thread extends for the full length of the screw and that a gradual change is provided in the form of the root or groove of the screw from arcuate or round bottomed to flat bottomed thereby providing a changing direction of pressure between the screw and the screen which reduces the amount of radial pressure toward the screen as the product progresses through the machine, radial pressure being reduced to a minimum where the root of the screw is flat. It will be noted in Fig. 4 that for substantially the last turn of the screw the root is flat and that the space between the flat root and the screen is not diminished so that the pressure of the drier pulp against the screen, which pressure in other machines has been found to be destructive of the discharge end of the screen, is relieved and reduced to a minimum. The squeezing of the pulp in this final stage of extraction is obtained largely by the lateral pressure (in the direction of arrow 53 in Fig. 3) of the side wall of the thread and the decreasing lead of the screw. Also, the thread is carried right up to the discharge end. In this way, the so-called "packing area" found at the discharge end of arcuate root screws is eliminated so that longer screen life is obtained while retaining the speedy juice extracting characteristics of the arcuate root for the major portions of the screw length.

At the discharge end of the screw as viewed in Figs. 3 and 4, a tapered end surface 61 is provided which is spaced from and opposed to a similar tapered surface 62 of the adjustable throat member 23, which comprises a throat ring 63 supported by three spaced tapered arms 64 from end plate 66 which is threaded within the refuse discharge housing 15 and is provided with adjusting handle 67. By adjusting the handle 67, the throat ring 63 can be moved inwardly and outwardly with reference to the discharge end surface 61 of the screw to vary the width of the restricting space through which the pomace of the fruit being processed must be forced by the action of the screw. To maintain an adjusted position of the throat member, a set screw 71 is threaded in boss 72 of the discharge housing 15 whereby the inner end can be engaged with the throat ring 63 to maintain the desired adjustment thereof. An inspection cover 73 is provided to close the top opening in the refuse discharge chamber 15.

While I have shown and described a preferred embodiment of the invention, it will be apparent that the invention is capable of both variation and modification from the form shown and described, and that the breadth of the invention therefore should be measured only by the scope of the claims appended hereto.

I claim:

1. In a juice extracting machine, a cylindrical screen, a juice expressing screw disposed within said screen having a tapered end surface at the discharge end thereof, pomace discharge means including an inclosed passage communicating with the discharge end of said screen, throat means adjustably mounted in said discharge means and having a tapered surface spaced from said end surface to provide a discharge throat, a bearing mounted in said throat means for journalling said screw therein, and means accessible from the exterior of said passage operatively connected with said throat means to position the tapered surface on said throat means relative to the tapered end surface of said expressing screw.

2. In a juice extracting machine, a cylindrical screen, a juice expressing screw disposed within said screen having a tapered end surface at the discharge end thereof, pomace discharge means including a housing having an aperture communicating with the discharge end of said screen and having a threaded opening in axial alignment with said screw and spaced therefrom, and throat means including a member adjustable from the exterior of said housing threadedly engaged with and closing said opening and a part disposed in said aperture of said housing having a surface presented to said end surface to provide a pomace discharge throat.

3. In a juice extracting machine, a cylindrical screen, a juice expressing screw disposed within said screen having a tapered end surface at the discharge end thereof, pomace discharge means including a housing having an aperture communicating with the discharge end of said screen and having a threaded opening in axial alignment with said screw and spaced therefrom, throat means adjustable from the exterior of said housing threadedly engaged with and closing said opening and having a surface presented to said end surface to provide a pomace discharge throat, and a bearing mounted to said throat means for journalling said screw therein.

4. In a juice extracting machine, a screw housing comprising a perforated screen, a juice expressing screw mounted within and extending axially of said housing, and means forming a restricted discharge outlet for the discharge of material from said housing, the groove of said screw being round bottomed at its receiving end and becoming progressively shallower toward its discharge end, and the leading face of the screw thread substantially throughout the shallowest portions of the groove having at least a portion of its surface adjacent its rim steeply sloped so that the force exerted thereby on material passing along said shallowest portion of the groove is predominantly endwise.

5. In a juice extracting machine, a screw housing comprising a perforated screen, a juice expressing screw mounted within and extending axially of said housing, and means forming a restricted discharge outlet for the discharge of material from said housing, the groove of said screw being round bottomed at its receiving end and becoming progressively shallower toward its discharge end, and the leading face of the screw thread substantially throughout the shallowest portion of the groove having at least a portion of its surface adjacent its rim so sloped that the force exerted normally of its surface on material passing along said shallowest portion of the groove is at an angle of not more than about 30 degrees from the screw axis.

6. In a juice extracting machine, a screw housing comprising a perforated screen, a juice expressing screw mounted within and extending axially of said housing, and means forming a restricted discharge outlet for the discharge of material from said housing, the groove of said screw becoming progressively shallower toward its discharge end and varying in shape from round bottomed form at its receiving end to a flat bottomed portion forming the shallowest part of the groove, and the leading face of the screw thread substantially throughout said flat bottomed portion of the groove having at least a portion of its surface adjacent its rim steeply sloped so that the force exerted thereby on material passing along said flat bottomed portion of the groove is predominantly endwise.

7. In a juice extracting machine, a screw housing comprising a perforated screen, a juice expressing screw mounted within and extending axially of said housing, and means forming a restricted discharge outlet for the discharge of material from said housing, the groove of said screw becoming progressively shallower toward its discharge end and varying in shape from round bottomed form at its receiving end to a flat bottomed section of uniform depth forming the shallowest part of the groove, and the leading face of the screw thread substantially throughout said flat bottomed section of the groove having at least a portion of its surface adjacent its rim steeply sloped so that the force exerted thereby on material passing along said flat bottomed section of the groove is predominantly endwise.

8. In a juice extracting machine, a screw housing comprising a perforated screen, a juice expressing screw mounted within and extending axially of said housing, and means forming a restricted outlet for the discharge of material from said housing, the groove of said screw being round bottomed at its receiving end and becoming progressively shallower toward its discharge end, and the leading face of the screw thread being of greater slope substantially throughout the shallowest portion of the groove than in the immediately preceding portion whereby to increase the endwise pressure on the material passing along said shallowest groove portion.

9. In a juice extracting machine, a screw housing comprising a perforated screen, a juice expressing screw mounted with in and extending axially of said housing, and means forming a restricted outlet for the discharge of material from said housing, the groove of said screw being round bottomed at its receiving end and becoming progressively shallower toward its discharge end, the shallowest portion of the groove being of uniform depth for a distance adjacent the discharge end of the screw, and the leading face of the screw thread being of greater slope substantially throughout the shallowest portion of the groove than in the immediately preceding portion whereby to increase the endwise pressure on the material passing along said shallowest groove portion.

10. In a juice extracting machine, a screw housing comprising a perforated screen, a juice expressing screw mounted within and extending axially of said housing, and means forming a restricted outlet for the discharge of material from said housing, the groove of said screw becoming progressively shallower toward its discharge end and varying in shape from round bottomed form at its receiving end to a flat bottomed portion forming the shallowest part of the groove, the leading face of the screw thread being of greater slope substantially throughout said flat bottomed portion than over the immediately preceding portion whereby to increase the endwise pressure on the material passing through such flat bottomed portion.

11. In a juice extracting machine, a screw housing comprising a perforated screen, a juice expressing screw mounted within and extending axially of said housing, and means forming a restricted outlet for the discharge of material from said housing, the groove of said screw becoming progressively shallower toward its discharge end and varying in shape from round bottomed form at its receiving end to a flat bottomed section of uniform depth forming the shallowest part of the groove, the leading face of the screw thread being of greater slope substantially throughout said flat bottomed section than over the immediately preceding portion whereby to increase the endwise pressure on the material passing through such flat bottomed section.

12. In a juice extracting machine, a screw housing comprising a perforated screen, a juice expressing screw mounted within and extending axially of said housing, and means forming a restricted outlet for the discharge of material from said housing, the groove of said screw being round bottomed at its receiving end and becoming progressively shallower toward its discharge end, the leading face of the screw thread being flattened substantially throughout the shallowest portion of the groove and steeply sloped to exert increased endwise pressure on the material entering and passing through said shallowest portion.

13. In a juice extracting machine, a screw housing comprising a perforated screen, a juice expressing screw mounted within and extending axially of said housing, and means forming a restricted outlet for the discharge of material from said housing, the groove of said screw being round bottomed at its receiving end and becoming progressively shallower toward its discharge end, the leading face of the screw thread being substantially flat throughout substantially the entire extent of the shallowest portion of the groove and having an angle of not less than about 60 degrees from the screw axis whereby the force exerted by said face on the material passing through said shallowest portion is predominantly endwise of the screw.

14. In a juice extracting machine, a screw housing comprising a perforated screen, a juice expressing screw mounted within and extending axially of said housing, and means forming a restricted discharge throat for the discharge of material from said housing, the bottom of the groove of said screw being round at its receiving end and having a gradual reduction of its curvature toward its discharge end whereby the groove becomes progressively shallower and the leading face of the screw thread substantially throughout the shallowest portion of the groove having at least a portion of its surface adjacent its rim steeply sloped so that the force exerted thereby on material passing along said shallowest portion of the groove is predominantly endwise.

15. In a juice extracting machine, a screw housing comprising a perforated screen, a juice expressing screw mounted within and extending axially of said housing, and means forming a restricted discharge throat for the discharge of material from said housing, the bottom of the groove of said screw being round at its receiving end and having a gradual reduction of its curvature toward its discharge end whereby the groove becomes progressively shallower, and the leading face of the screw thread being of greater slope substantially throughout the shallowest portion of the groove than in the immediately preceding portion whereby to increase the endwise pressure on the material passing along said shallowest groove portion.

16. In a juice extracting machine, a screw housing comprising a perforated screen, a juice expressing screen mounted within and extending axially of said housing, and means forming a restricted outlet for the discharge of material from said housing, the groove of said screw being round bottomed at its receiving end and becoming progressively shallower and narrower toward its discharge end, the shallowest portion of the groove being of uniform depth and width for a distance adjacent the discharge end of the screw, and the leading face of the screw thread substantially throughout the shallowest portion of the groove having at least a portion of its surface adjacent its rim steeply sloped so that the force exerted thereby on material passing along said shallowest portion of the groove is predominantly endwise.

17. In a juice extracting machine, a screw housing comprising a perforated screen, a juice expressing screw mounted within and extending axially of said housing, and means forming a restricted outlet for the discharge of material from said housing, the groove of said screw being round bottomed at its receiving end and becoming progressively shallower and narrower toward its discharge end, the shallowest portion of the groove being substantially flat bottomed and of uniform depth and width for a distance adjacent the discharge end of the screw, and the leading face of the screw thread substantially throughout the shallowest portion of the groove having at least a portion of its surface adjacent its rim steeply sloped so that the force exerted thereby on material passing along said shallowest portion of the groove is predominantly endwise.

18. In a juice extracting machine, a screw housing comprising a perforated screen, a juice expressing screw mounted within and extending axially of said housing, and means forming a restricted discharge throat for the discharge of material from said housing, the bottom of the groove of said screw being round at its receiving end and having a gradual reduction of its curvature toward its discharge end whereby the groove becomes progressively shallower, the shallowest portion of the groove being substantially flat bottomed and of uniform depth for a distance adjacent the discharge end of the screw, the lead of the screw thread progressively decreasing along the round bottomed portion of the groove and being constant substantially throughout the flat bottomed portion of the groove, and the leading face of the screw thread substantially throughout the shallowest portion of the groove having at least a portion of its surface adjacent its rim steeply sloped so that the force exerted thereby on material passing along said shallowest portion of the groove is predominantly endwise.

CHARLES E. KERR.